Dec. 22, 1942.     H. C. IRVIN     2,305,700
UNIVERSAL COUPLING
Filed Sept. 29, 1941
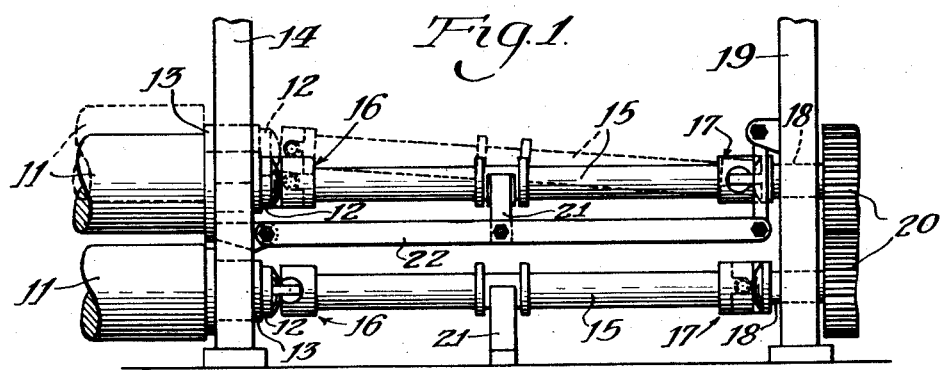
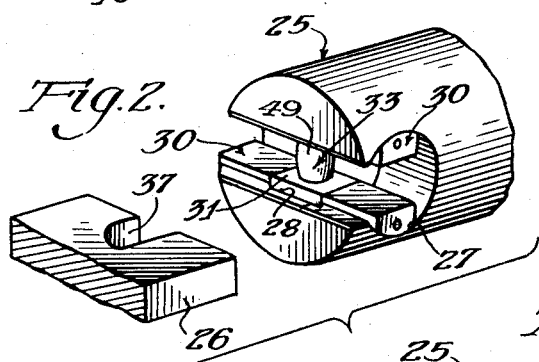
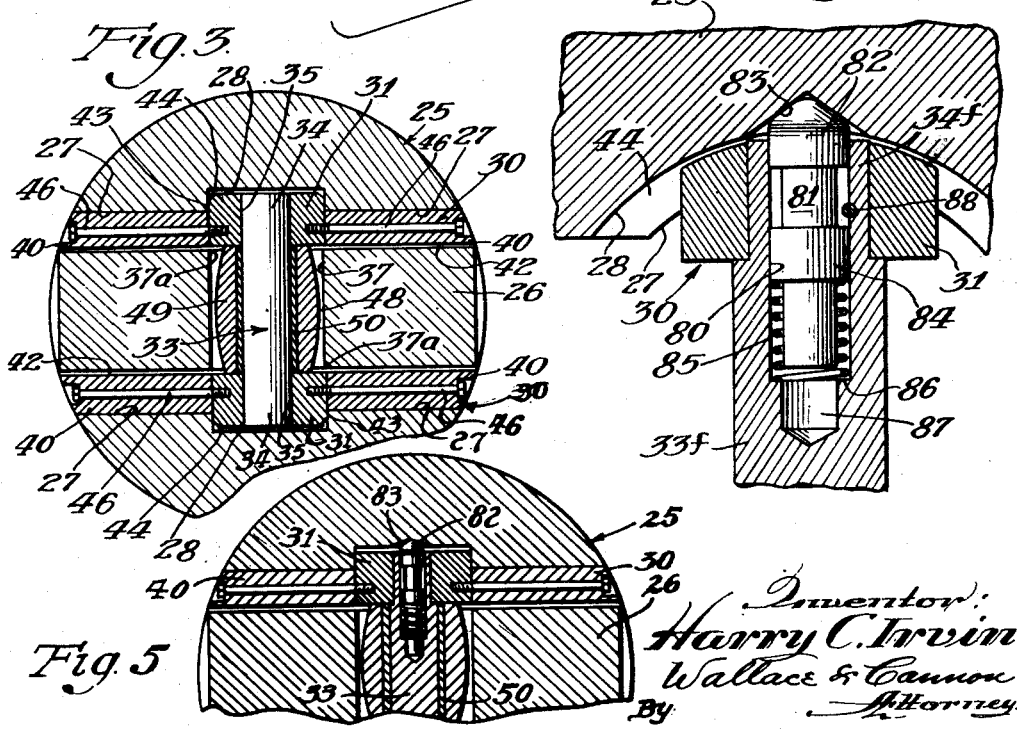
Inventor:
Harry C. Irvin
Wallace & Cannon
By Attorneys Patented Dec. 22, 1942

2,305,700

UNITED STATES PATENT OFFICE 2,305,700

UNIVERSAL COUPLING

Harry C. Irvin, Detroit, Mich., assignor to The American Brake Shoe and Foundry Company, Wilmington, Del., a corporation of Delaware Application September 29, 1941, Serial No. 412,738

11 Claims. (Cl. 64—7)

This invention relates to bearings and primarily to slipper bearings for universal joint connections and the like.

In instances where torque is to be transmitted from a driving shaft to a driven shaft where such shafts are arranged in end to end relation in such a way that they may move into angular relationship with each other, it is customary to interconnect the shafts by a universal joint or the like. One form of universal joint which has been used in such instance comprises a female member formed on or secured to an end of one of the shafts, and a male member is similarly provided on the adjacent end of the other shaft. In such a joint the male member is inserted into the female member and an interconnection therebetween is afforded by what are known as slipper bearings and also a pivotal interconnection and the arrangement is such that relative pivotal movement about axes at right angles to each other is afforded whereby a driving interconnection is maintained between the driving and driven parts of the joint when these parts move out of axial alignment one with the other.

Usually a flat fishtail or tongue is provided on the male member of a joint of the aforesaid character and a bifurcation is provided in the female member into which the aforesaid tongue is passed. Arcuate recesses are formed in opposed faces of the bifurcation in the female member and these recesses extend transversely across the bifurcation in the female member. Slipper bearings in the form of segments of a cylinder are disposed in the aforesaid recesses and the flat faces of such segments are disposed on opposite faces of the aforesaid tongue when it is extended into the bifurcation. A bearing or spacing pin centrally located with respect to the longitudinal extent of the slipper bearings and extended therebetween is received in a bifurcation or other suitable opening in the tongue and it is this that affords one of the axes about which parts may move upon disalignment of the driving and driven portions, the slipper bearings rotating in the aforesaid arcuate recesses to afford the other of the axes about which the relative pivotal movement may occur.

In what may well be referred to as the conventional type of slipper bearings heretofore employed in universal couplings of the aforesaid character, each bearing comprises a medial boss portion having an opening or socket for receiving an end of the aforesaid bearing pin, and two end sections which are integral with and extend in opposite directions from the boss. When such slipper bearings are employed where the male and female members of the coupling are operated continuously in the same direction of rotation over long periods of time, as in the case of steel rolling mills, for example, there is a tendency for one end section of each bearing and the opposed bearing surfaces of the female portion of the coupling to become badly worn. The driving force imposed between the tongue and the female portion of the coupling is effective in such instances to press such worn end sections of the slipper bearings against the opposed worn surfaces of the female member of the coupling, and in so doing the tongue is in effect twisted within the bifurcation of the female member of the coupling until the edges of the slot in the tongue engage the bearing pin and apply a substantial force couple to the bearing pin. This force couple imparts undesired stresses to the bearing pin, thereby causing undue wear on the pin and enlargement of the opening in the tongue, and in addition, the force couple acts through the bearing pin to impose stress upon the boss tending to crush the boss and to wear the pin-receiving opening therein.

An important object of the invention is, therefore, to avoid such stresses and wear in the bearing pin and bosses of such slipper bearings. A further object is to protect the bearing pin which interconnects the slipper bearings from shearing stresses, and ancillary objects are to cushion this pin against the impact of the male tongue of the universal coupling and to prevent the bearing pin from being stressed at points adjacent the sockets in the slipper bearing bosses in which the pin is received.

A still further object is to reduce the amount of wear of the bearing pin as well as to prevent undue enlargement of the opening in the tongue in which this pin is disposed, thereby minimizing the impact stresses caused by loose play between the pin and tongue.

When a universal coupling of the character referred to hereinabove is being assembled, a pair of slipper bearings are first mounted in spaced relation on opposite ends of the bearing pin with their flat faces opposed, and this bearing assembly is then inserted in the cylindrical recesses in opposed faces of the branches of the bifurcation in the female member and the assembly is rotated into a position such that the tongue of the male member, when it is received in the female member, may pass between the flat faces of the slipper bearings. It is desirable, of course, that the flat faces of the slipper bearings shall be parallel with the line of movement along which the tongue is guided into the female member for otherwise the tongue may strike a portion of a slipper bearing and damage the bearing, particularly where the shafts which are to be coupled are unwieldy and heavy and are therefore apt to acquire considerable momentum when moved relatively for the purpose of assembling the universal coupling.

Therefore, an object of the invention is to insure that the flat faces of the slipper bearings are parallel with the line of movement of the tongue relative to the female member when the coupling is being assembled, and, more specifically, to accomplish this by arranging a spring-pressed dog in at least one end of the bearing pin to cooperate with at least one tapered notch in the arcuate bearing surface of the female member for the purpose of camming the bearing assembly rotatively into its proper position when it is angularly displaced therefrom prior to insertion of the tongue into the female member, and yieldingly retaining the bearing assembly in such position while it is receiving the tongue.

Other and further objects of the present invention will be apparent from the following description and claims and will be understood by reference to the accompanying drawing which, by way of illustration, shows preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawing,

Fig. 1 is a fragmental elevational view of a rolling mill and the driving means therefor;

Fig. 2 is a perspective view illustrating the coupling embodying the features of the invention;

Fig. 3 is a transverse sectional view of the coupling shown in Fig. 2;

Fig. 4 is an enlarged longitudinal sectional view of a portion of a universal coupling showing the device for rotatably adjusting and positioning the slipper bearing assembly; and Fig. 5 is a sectional view illustrating the positioning device incorporated in the bearing pin of the structure shown in Fig. 3.

A rolling mill of the character in which the slipper bearings of the present invention may be utilized, is fragmentally shown in Fig. 1. As therein illustrated the rolling mill 10 includes a pair of opposed rolls 11, the end portions or pintles 12 of which are journaled in bearings as 13 that are carried by the frame members as 14. These end portions 12 of the rolls 11 project beyond this frame member 14 and are connected by means of universal joints or couplings 16 to spindles 15, which are in turn connected by universal couplings 17 to stub shafts 18 that are carried by a frame member 19. A suitable driving means (not shown) is connected to the stub shafts 18 by gearing 20 for the purpose of rotatively driving the spindles 15 and connected rolls 11. Thrust or spindle carrier bearings 21 disposed between the frame members 14 and 19 support the spindles 15 at the middle portions thereof.

The bearings 13 which carry the upper rolls 11 are vertically adjustable in the frame members as 14 in order that the rolls 11 may be vertically spaced to accommodate varying thicknesses of material. The spindle carrier bearing 21 for the upper spindle 11 is supported by a linkage 22 which is so connected to the upper bearing 13 that this bearing 21 may continue to support the upper spindle 15 when it has been moved to a position such as that indicated by the broken line in Fig. 1. Driving connections between this spindle 15 and its associated roll 11 and stub shaft 18 are maintained by the respective universal couplings 16 and 17 even though these members are not in longitudinal alignment with each other.

Each universal coupling 16 or 17 includes a female member 25, which is formed on or secured to an end of a spindle as 15, and a male member 26 which is provided on the adjacent end of an associated stub shaft as 18 or a pintle as 12. As commonly constructed, the female member 25 is bifurcated as shown in Figs. 2 and 3 to receive the male member, which is in the form of a flat tongue 26. The branches of the bifurcation in the female member 25 are arcuately recessed as indicated at 27. Deeper recesses 28 are afforded in the female member 25 midway between the ends of the cylindrical recesses 27 in order to define shoulders as 44, for a purpose that will be explained hereinafter.

The slipper bearings generally designated 30 which are employed in such universal couplings are constructed approximately in the form of segments of a cylinder, and one of these slipper bearings 30 is disposed in each cylindrical recess 27 in each female member 25, whereby one such bearing is located on each side of the tongue 26, Figs. 2 and 3. The medial portion or boss 31 of each slipper bearing 30 is of greater thickness than the end sections 40 of such bearing, and this boss 31 is adapted to fit in the deep recess 28 in the female member 25 while the end sections 40 are disposed in contact with the arcuate bearing surfaces within the cylindrical recesses 27, the convex surfaces of the bosses 31 and end sections 40 respectively, conforming generally with the arcuate surfaces 28 and 27 when the slipper bearings are assembled in the coupling so that the convex surfaces of the end sections 40 may cooperate with the bearing surfaces 27. A bearing or spacing pin 33 is interposed between the slipper bearings 30 to maintain these bearings in spaced relation, this pin 33 having end portions 34 which are fitted in holes 35, Fig. 3, extending through the bosses 31. The tongue 26 of the coupling is provided with a bifurcation or slot 37, Fig. 3, in which the pin 33 is disposed when the tongue 26 is inserted into the female member 25, clearance being afforded between the pin 33 and the tongue 26 to facilitate assembling the coupling and to enable the necessary freedom of movement of the parts relative to each other when the coupling is in service.

When the shafts which are interconnected by a universal coupling as 16 or 17, Fig. 1, are not longitudinally aligned, as is the case when the upper spindle 15 and roll 11 are in their broken-line positions, Fig. 1, the tongue 26 constantly changes its angular position relative to the female member 25 of such coupling as the shafts are rotated and this causes the slipper bearings 30 to rock back and forth rotatively within the cylindrical recesses 27 and 28 in the female member 25, Fig. 3. However, the slipper bearings 30 are restrained against longitudinal movement by the end faces 43 of the bosses 31 which abut the shoulders as 44 intermediate the recesses 27 and 28.

When the universal coupling is in service in a continuous type of rolling mill, the tongue 26 tends to bear against only one of the end sections 40 of the slipper bearing 30, the other end section of such bearing being relatively free from such stress. As the more heavily stressed end sections 40 of the slipper bearings 30 rub against their cooperating bearing surfaces 27 in the female member 25, the opposed arcuate surfaces 27 of the female portions of the coupling and the material of which these bearing end sections are composed gradually wears away, the greatest amount of wear taking place at the outward extremities of the more heavily stressed end sections 40. It should be observed that by reason of such wear the effective depth of the arcuate recess 28 may often be reduced and in some instances seating of the boss 31 against the bottom of the groove might act to prevent seating of the end sections 40 against the load bearing surfaces 27. To avoid this objectionable condition the boss 31 is made of such a height as to be spaced normally from the bottom of the groove 28.

As herein shown the end sections 40 of the slipper bearings are made separate from the boss section 31, and are secured thereto in an operative relation by means such as bolts 46 which may be mounted and related to the boss and the end sections in the manner described in the co-pending application of Thomas J. Healy, Serial No. 412,750, filed September 29, 1941. Insofar as the present invention is concerned, however, such separate formation of the end sections and boss, as distinguished from integral formation thereof, is immaterial, for in each instance the wear in the stressed end sections and the opposed female bearing surfaces produces similar stress and wear conditions which it is an object of the present invention to overcome. Thus, with reference to Fig. 3 of the drawing, it will be evident that as wear of the effective end sections 40 and the opposed surfaces 27 permits the tongue 26 and the pin 33 to shift from their normally perpendicular relation, the edges as 37a of the slot 37 may act as a force couple on the pin 33. Since such action is opposed by the tightness of the pin end 34 in the sockets or boss holes 35, and by reaction of the edges 43 of the boss against certain edge surfaces 44 of the recess 28, it will be evident that wear of the holes 35 in the boss will result. Moreover such a force couple exerts a substantial crushing force upon the material of the boss, since the end portions 34 of the pins 33 act to compress portions of the material of the boss between the pin and the surfaces 44.

In accordance with the present invention these undesirable conditions are obviated through the use of a crowned outer surface 48 on the central portion of the bearing pin 33. When such a crowned surface 48 is employed the requisite bearing area is afforded on the pin 33 for engagement by the sides of the slot 37 to thereby maintain the tongue 26 in the desired relationship to the axis of the pin 33, and yet the application of an objectionable force couple to the pin 33 is avoided. In this connection it will be observed that the crowned surface 48 affords clearance for the corners 37a, and the driving force will therefore be transmitted between the driving and driven members solely by the compression of the end sections 40 in the normal manner, even though the coupling is quite worn.

In the present instance the crowned surface 48 is formed on a separately formed metallic sleeve 49, which surrounds the central portion of the pin 33 and acts as a spacer between the slipper bearings 30, but if desired, this surface could be formed directly upon the pin 33. In the present form, however, and as a further aid in avoiding undesired stresses and shocks in the slipper bearings, and in relieving and avoiding fatigue stresses in the bearing pin 33 the sleeve 49 is mounted on the pin 33 with a sleeve 50 of resilient material such as rubber interposed between the pin 33 and the sleeve 49. Thus the crowned sleeve 49 serves as a separator between the two slipper bearings 30; and any forces applied between the tongue 26 and the pin 33 transversely of the pin are cushioned effectually by the resilient sleeve 50. This has the further advantage of preventing undue enlargement of the bifurcation 37 in the tongue 26, which ordinarily results from wear caused by impact.

When a universal coupling such as 16 or 17, Fig. 1, is being assembled, it is desirable that the flat faces as 42 of each slipper bearing as 30, Fig. 3, shall be parallel with the line of movement along which the tongue 26 is guided into the female member 25; otherwise the tongue may strike a portion of a slipper bearing and cause damage to the bearing structure. For the purpose of properly orienting the slipper bearings in the female member of the coupling, a device such as that illustrated in Figs. 4 and 5 may be employed. As shown in this view, the reduced portion 34f on at least one end of the bearing pin 33f extends through the boss 31 of a slipper bearing toward the arcuate surface 28 in the female member 25 the same as in the case of the bearing pin 33 in Figs. 2 and 3. However, in the present instance a bore 80 is afforded in this end of the pin 33f and extends longitudinally through the pin for a limited distance. The bore 80 serves as a socket for the reception of a plunger 81 carrying at its outer end a dog 82 which is adapted to cooperate with a tapered notch or indentation 83 in the arcuate surface 28 of the female member 25. A collar 84 is formed on the plunger 81 in spaced relation to the dog 82, this collar 84 and the dog 82 being of slightly larger diameter than the body of the plunger 81 and having a sliding fit within the bore or socket 80. A helical spring 85 is disposed about the plunger 81 intermediate the collar 84 and a shoulder 86 which is defined at the base of the socket 80 around the edge of a communicating opening 87 having a diameter slightly smaller than that of the socket hole 80.

Whenever the dog 82 rides into the tapered notch 83 it exerts a camming action upon the slipper bearing assembly and tends to rotate this assembly into the position shown in Fig. 2 in which the flat faces of the slipper bearings 30, Fig. 3, will be parallel to the line of movement along which the tongue 26 is guided into the female member 25, as shown in Figs. 2 and 3, when the universal coupling is being assembled. Thus, when the slipper bearing assembly comprising the slipper bearing 30 and pin 33, Fig. 2, is inserted into the bifurcation in the female member 25, it is merely necessary to manually rotate the bearing assembly until the dog 82 seats into the notch 83, Figs. 4 and 5, whereupon the dog 82 yieldingly maintains the bearing assembly in such position while the tongue 26 is being inserted into the female member 25.

A locking pin 88, which is passed transversely through the reduced end portion 34f of the bearing pin 33f, is disposed adjacent the portion of the plunger 81 intermediate the dog 82 and collar 84 to limit the sliding movement of the plunger 81 under the influence of the spring 85 when the slipper bearing assembly is removed from the female member. When the universal coupling is being disassembled, and the tongue 26 is withdrawn from the female member 25, the dog 82 enters the notch 83 to orient the slipper bearing assembly in the manner explained hereinabove. When the bearing assembly is in service the slipper bearings may rock back and forth in the female member 25 and in this event the plunger 81 shifts in alternate directions in the socket 80 as the dog 82 passes into and out of the notch 83, the inner end of the plunger 81 alternately entering and being withdrawn from the opening 87 at the base of the socket 80.

From the foregoing it will be apparent that the present invention protects the parts of the slipper bearing assembly from shocks and stresses during assembly as well as while in use; and this result is attained whether the slipper bearings be of integral or multiple-part construction. Moreover, the present invention eliminates the application of objectionable forces to the bearing pin, and thus avoids fatigue stresses in the bearing pin.

However, while I have illustrated and described selected embodiments and features of my invention, it is to be understood that these are capable of variation and modification and I therefore do not wish to be limited to the precise details set forth but desire to avail myself of such changes and alterations as fall within the purview of the following claims.

I claim:

1. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof, the combination of a pair of slipper bearings respectively disposed in the arcuate recesses and including convex faces arranged at least at the ends thereof to conform with the recesses and also having flat faces respectively disposed toward opposed flat faces of said tongue, a metallic pin extended through the opening in said tongue and interconnecting said slipper bearings, a resilient sleeve disposed on said pin to cushion said pin against the impact of said tongue and a metallic sleeve mounted on said resilient sleeve intermediate said slipper bearings to protect said resilient sleeve.

2. A device as set forth in claim 1, in which said metallic sleeve is crowned to take up the clearance between said resilient sleeve and said tongue and thereby further relieve said pin and the related portions of said slipper bearings of impact stresses.

3. A slipper bearing assembly comprising a pair of slipper bearings each having a centrally apertured central boss and a pair of end sections projecting therefrom, a bearing pin having its opposite ends thereof extended into the central apertures of the bosses of said slipper bearings, said pin having an inner resilient sleeve and an outer metallic sleeve surrounding said pin in concentric relation between said slipper bearings to space said slipper bearings from each other and cushion transverse forces applied to said pin.

4. A bearing pin for slipper bearing assemblies comprising a metallic pin, a resilient sleeve surrounding said pin so that the ends of the pin extend beyond said sleeve, and a metallic sleeve surrounding said resilient sleeve to act as a spacer between slipper bearings associated with opposite ends of said pin.

5. A bearing pin for slipper bearing assemblies comprising a metallic pin, a resilient sleeve surrounding said pin so that the ends of the pin extend beyond said sleeve, and a metallic sleeve surrounding said resilient sleeve to act as a spacer between slipper bearings associated with opposite ends of said pin, said metallic sleeve being tapered to a smaller outer diameter toward its ends to thereby present a crowned outer surface.

6. In a universal coupling including a bifurcated female member and a male member comprising a flat tongue adapted to be received in such bifurcation and which tongue has an open-ended slot therein for the reception of a bearing pin and wherein the branches of the bifurcation have opposed arcuate recesses therein that extend transversely and to the free edges thereof, the combination of a bearing assembly comprising a pair of slipper bearings respectively disposed in the arcuate recesses in said female member and including convex faces to conform with bearing portions of the recesses and also having flat faces respectively disposed toward opposed flat faces of said tongue, said bearing assembly also including a bearing pin uniting said slipper bearings and a device mounted on said bearing assembly and cooperating with a portion of said female member to retain said bearing assembly in proper angular position to receive said tongue when the universal coupling is being assembled.

7. In a universal coupling including a bifurcated female member and a male member comprising a flat tongue adapted to be received in such bifurcation and which tongue has an open-ended slot therein for the reception of a bearing pin and wherein the branches of the bifurcation have opposed arcuate recesses therein that extend transversely and to the free edges thereof, the combination of a pair of slipper bearings respectively disposed in the arcuate recesses and including convex faces to conform with bearing surfaces of the recesses and also having flat faces respectively disposed toward opposed flat faces of said tongue, each of said slipper bearings having an opening therein which is aligned with the slot in said tongue when said tongue and slipper bearings are arranged in operative relation, a bearing pin fitted snugly at its ends in the openings in said slipper bearings and maintaining said bearings in spaced relation, said pin and slipper bearings constituting a united bearing assembly, and yieldable means mounted on said bearing assembly and cooperating with a portion of said female member to retain said bearing assembly in proper angular position to receive said tongue when the universal coupling is being assembled.

8. In a universal coupling including a bifurcated female member and a male member comprising a flat tongue adapted to be received in such bifurcation and which tongue has an open-ended slot therein for the reception of a bearing pin and wherein the branches of the bifurcation have opposed arcuate recesses therein that extend transversely and to the free edges thereof, the combination of a pair of slipper bearings respectively disposed in the arcuate recesses and including convex faces to conform with bearing surfaces of the recesses and also having flat faces respectively disposed toward opposed flat faces of said tongue, each of said slipper bearings having an opening therein which is aligned with the slot in said tongue when said tongue and slipper bearings are arranged in operative relation, a bearing pin extended through the slot in said tongue and fitted in the openings in said slipper bearings, said pin and slipper bearings constituting a united bearing assembly, and a spring-urged dog mounted in one end of said pin and extending radially into engagement with the adjacent arcuate surface within said female member, said arcuate surface including an indentation with which said dog is adapted to cooperate for yieldingly adjusting and retaining said bearing assembly in predetermined angular position to receive said tongue when the universal coupling is being assembled.

9. In a bearing pin structure for slipper bearing assemblies, a pin having reduced shouldered ends and having a central bore formed therein opening through one end thereof, and a spring pressed plunger assembly mounted in said bore and including a plunger urged outwardly toward a projecting relationship with respect to said open end of said bore.

10. In a universal coupling including a bifurcated female member and a male member comprising a flat tongue adapted to be received in such bifurcation and which tongue has an open-ended slot therein for the reception of a bearing pin and wherein the branches of the bifurcation have opposed arcuate recesses therein that extend transversely and to the free edges thereof, the combination of a pair of slipper bearings respectively disposed in the arcuate recesses and including convex faces to conform with bearing surfaces of the recesses and also having flat faces respectively disposed toward opposed flat faces of said tongue, each of said slipper bearings having an opening therein which is aligned with the slot in said tongue when said tongue and slipper bearings are arranged in operative relation, a bearing pin structure comprising a metallic pin extending at its opposite ends into the respective openings in said slipper bearings, a resilient sleeve surrounding said metallic pin between said slipper bearings, and a metallic sleeve surrounding said resilient sleeve and acting as a spacer between said slipper bearings, said bearing pin structure and slipper bearings constituting a united bearing assembly, and yieldable means mounted on said bearing assembly and cooperating with a portion of said female member to retain said bearing assembly in proper angular position to receive said tongue when the universal coupling is being assembled.

11. In a universal coupling including a bifurcated female member and a male member comprising a flat tongue adapted to be received in such bifurcation and which tongue has an open-ended slot therein for the reception of a bearing pin and wherein the branches of the bifurcation have opposed arcuate recesses therein that extend transversely and to the free edges thereof, the combination of a pair of slipper bearings respectively disposed in the arcuate recesses and including convex faces to conform with bearing surfaces of the recesses and also having flat faces respectively disposed toward opposed flat faces of said tongue, each of said slipper bearings having an opening therein which is aligned with the slot in said tongue when said tongue and slipper bearings are arranged in operative relation, a bearing pin structure comprising a metallic pin extending at its opposite ends into the respective openings in said slipper bearings, a resilient sleeve surrounding said metallic pin between said slipper bearings, and a metallic sleeve surrounding said resilient sleeve and acting as a spacer between said slipper bearings, said metallic sleeve having a crowned outer surface tapering toward the ends thereof, said bearing pin structure and slipper bearings constituting a united bearing assembly, and yieldable means mounted on said bearing assembly and cooperating with a portion of said female member to retain said bearing assembly in proper angular position to receive said tongue when the universal coupling is being assembled.

HARRY C. IRVIN.